US009222520B2

(12) United States Patent
Cohen

(10) Patent No.: US 9,222,520 B2
(45) Date of Patent: Dec. 29, 2015

(54) SECURE UNIVERSAL-JOINT

(71) Applicant: ASHOT ASHKELON INDUSTRIES LTD., Ashkelon (IL)

(72) Inventor: Julian Cohen, Ashkelon (IL)

(73) Assignee: ASHOT ASHKELON INDUSTRIES LTD., Ashkelon (IL)

( * ) Notice: Subject to any disclaimer, the term of this patent is extended or adjusted under 35 U.S.C. 154(b) by 0 days.

(21) Appl. No.: 13/973,034

(22) Filed: Aug. 22, 2013

(65) Prior Publication Data

US 2014/0274425 A1   Sep. 18, 2014

Related U.S. Application Data

(60) Provisional application No. 61/781,084, filed on Mar. 14, 2013.

(51) Int. Cl.
*F16D 3/40* (2006.01)
*F16D 3/38* (2006.01)
(52) U.S. Cl.
CPC ........................................ *F16D 3/38* (2013.01)
(58) Field of Classification Search
USPC ................. 464/11, 136; 403/174; 475/230; 29/525.08
See application file for complete search history.

(56) References Cited

U.S. PATENT DOCUMENTS

| | | | |
|---|---|---|---|
| 927,087 A | | 7/1909 | Vanderbeck |
| 2,302,272 A | * | 11/1942 | Stillwagon, Jr. .......... 464/136 X |
| 2,545,601 A | * | 3/1951 | Brubaker |
| 3,103,798 A | | 9/1963 | Platti |
| 3,232,076 A | | 2/1966 | Sundt |
| 3,300,258 A | | 1/1967 | Kompanek et al. |
| 3,962,889 A | | 6/1976 | Stillwagon, Jr. |
| 7,951,037 B2 | * | 5/2011 | Sudorowski et al. ......... 475/230 |
| 2009/0036222 A1 | | 2/2009 | Hu |

FOREIGN PATENT DOCUMENTS

| | | |
|---|---|---|
| EP | 0464984 | 8/1992 |
| GB | 575273 | 2/1946 |
| GB | 1146663 | 3/1960 |

\* cited by examiner

*Primary Examiner* — Gregory Binda
(74) *Attorney, Agent, or Firm* — Mark M. Friedman

(57) ABSTRACT

An apparatus for securing a first joint member to a second joint member in a universal-joint comprising at least one pin for insertion along a Y axis, at least one pin for insertion along an X axis, a coupler between the joint members configured to receive these pins, and a security pin configured to traverse the coupler along a Z axis when each of these pins are within the coupler, such that the security pin penetrates at least a partial hole in each of these pins. The at least one pin for insertion along the Y axis may be a main pin having two recesses. The at least one pin for insertion along the X axis may be two bracket pins each having a bracket extension. Grease may be injected into a center of a joint member through a fitting. Retaining rings may shrink the boot to a pre-defined limit.

16 Claims, 17 Drawing Sheets

SECURE UNIVERSAL-JOINT

FIELD AND BACKGROUND OF THE INVENTION

The present invention relates to apparatuses and methods for universal joints, and more particularly, to booted universal-joints in which the joint members are coupled to one another by means of pins configured to be more securely connected.

A universal-joint (see FIG. 1) is a component that allows transmission of rotational motion and torque through angled axes. One common use for these universal-joints, particularly booted universal-joints, is the flap deploying system of commercial aircraft. As shown in FIG. 6, grease may be injected by means of an injection device 88 squeezed between the boot and a joint member of the universal joint, which results in stretching the boot.

As a result of the constant bending loads, which may even include alternating bending loads, and the need to endure long term stress, for example twenty years of such stress in the case of a commercial aircraft flap deploying system, the security of the booted universal joint is of paramount concern, both in terms of the security of the universal joint itself as well as in terms of the security of the connection between the boot and the universal-joint.

Retaining rings, typically made of rigid aluminum, are often used to seal the boot against grease leakage and to maintain the position of the boot ends in place. Accordingly, a further problem is that the retaining rings pressed around the ends of the boot lightly compress the soft rubber boot toward the joint members, but since the boot is made of soft silicon rubber, the ends of the boot tend to easily move between the retaining rings and the joint members and eventually pull out of the universal-joint. This is exacerbated by the typical 12.5 degree articulation angle in the boot that creates tension on the outer face of the boot, encouraging the boot to be pulled out of the retaining rings, as shown in FIG. 11.

There is a compelling need to have a booted universal joint which can successfully and securely endure twenty years of bending loads and stress. It would be particularly advantageous to have such a booted universal joint that is secure both in terms of the connection between the boot and the universal joint as well as in terms of the security of the connection between the internal parts of the universal-joint.

SUMMARY OF THE PRESENT INVENTION

One aspect of the present invention is an apparatus for securing a first joint member to a second joint member in a universal-joint, the apparatus comprising at least one pin for insertion along a Y axis; at least one pin for insertion along an X axis; a coupler between the first and second joint members, the coupler configured to receive the at least one pin for insertion along a Y axis and the at least one pin for insertion along an X axis; and a security pin configured to traverse the coupler along a Z axis at a time when (i) each of the at least one pin for insertion along a Y axis and (ii) each of the at least one pin for insertion along an X axis, is within the coupler, such that the security pin penetrates at least a partial hole in (i) each of the at least one pin for insertion along a Y axis and in (ii) each of the at least one pin for insertion along an X axis.

Another aspect of the present invention is an apparatus for securing a main pin to a coupler coupling two joint members, the main pin having a first recess and a second recess, the coupler having a central aperture, the apparatus comprising a first bracket pin having a first bracket extension and configured to be inserted into the coupler along an X axis such that the first bracket extension mates with the first recess when the main pin is inserted in the coupler along a Y axis perpendicular to the X axis; a second bracket pin having a second bracket extension and configured to be inserted into the coupler along the X axis such that the second bracket extension mates with the second recess when the main pin is inserted in the coupler along the Y axis.

A still further aspect of the present invention is a method of securing a booted universal joint, the method comprising inserting at least one pin through a coupler along a Y axis; inserting at least one pin through the coupler along an X axis; and inserting a security pin configured to traverse the coupler along a Z axis at a time when (i) each of the at least one pin for insertion along a Y axis and (ii) each of the at least one pin for insertion along an X axis, is within the coupler, such that the security pin penetrates at least a partial hole in (i) each of the at least one pin for insertion along a Y axis and in (ii) each of the at least one pin for insertion along an X axis.

A yet still further aspect of the present invention is a booted universal-joint, comprising a first joint member and a second joint member, at least one of the first joint member and second joint member having a grease fitting for injecting grease into a center of the joint member; at least one pin for insertion along a Y axis; at least one pin for insertion along an X axis; and a coupler between the first and second joint members, the coupler configured to receive the at least one pin for insertion along a Y axis and the at least one pin for insertion along the X axis.

A further aspect of the present invention is a booted universal-joint, comprising a first joint member and a second joint member; a coupler between the first and second joint members; a boot covering the coupler and at least opposite ends of the first and second joint member, the boot having a convoluted outer surface including at least one wider section and at least two narrower sections; at least one pin for insertion along a Y axis; at least one pin for insertion along an X axis, the coupler configured to receive the at least one pin for insertion along a Y axis and the at least one pin for insertion along the X axis; and a springy retaining ring fitted on each of the at least two narrower sections, the retaining rings configured, when in place, to shrink the boot to a pre-defined limit without damaging the boot, and to not shrink the boot further beyond the pre-defined limit.

These and other features, aspects and advantages of the present invention will become better understood with reference to the following drawings, descriptions and claims.

BRIEF DESCRIPTION OF THE DRAWINGS

Various embodiments are herein described, by way of example only, with reference to the accompanying drawings, wherein.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a universal-joint that may be employed for example in the flap deploying system of commercial aircraft. The universal joint is a component of the flap deploying system that has to endure twenty years of use in the commercial aircraft. The security of the connections between the pins and the coupler are fundamentally important. The universal joint of the present invention may be booted and may include a first and second joint member with a coupler between them. The coupler may have openings for insertion of a main pin that may have a first recess (or other receiving member) and a second recess (or other receiving member), a first bracket pin that may have a first bracket extension that mates with the first recess, and a second bracket pin that may have a second bracket extension that mates with the second recess. A security pin may be inserted into the coupler preferably along an axis different from the axis along which the bracket pins are inserted and different from the axis along which the main pin is inserted. Grease may be injected directly into a joint member through a fitting at the center of the joint member without touching the boot. Springy retaining rings may be used to hold the boot ends and seal against leakage of grease.

Figure 1:
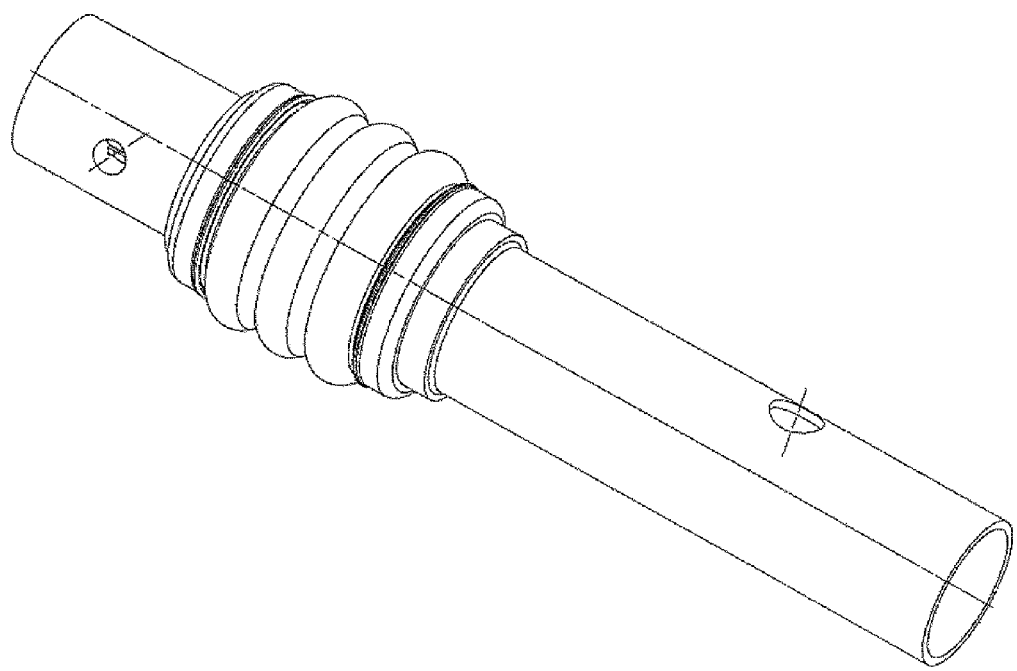
FIG. 1 is a prior art booted universal joint.
Figure 2:
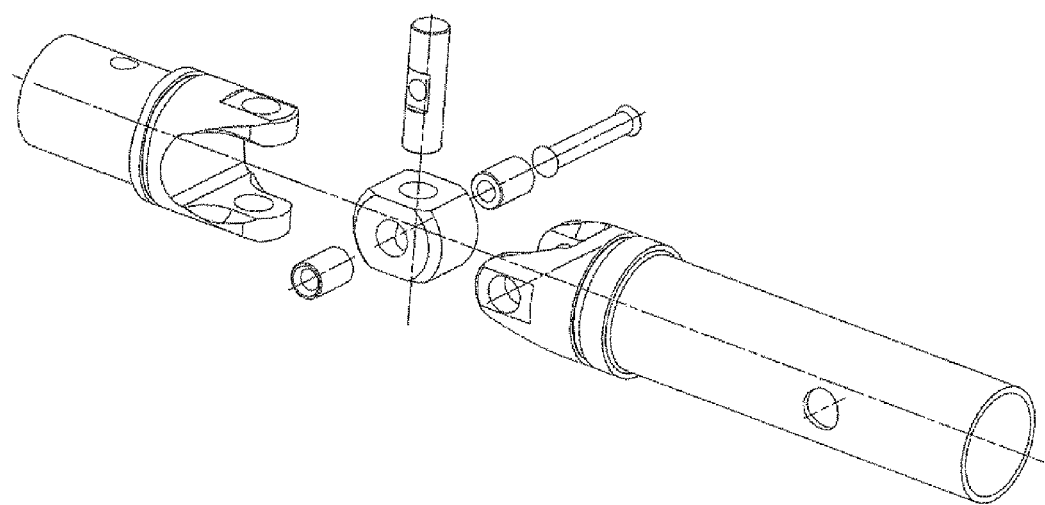
FIG. 2 is an exploded view of a prior art universal joint.

In contrast to prior art universal joints, in which the securing pin, for example a rivet, runs axially along a direction of insertion of one or more of the other pins (as shown in FIG. 2), the apparatus of the present invention may utilize a security pin that may run perpendicular (for example along a Z axis) to the directions of insertion of the other pins. For example the apparatus may include at least one pin for insertion along a Y axis and at least one pin for insertion along a Z axis. In contrast to prior art universal joints (see for example FIG. 2), in which short pins extending into a coupler may have been bored through to accommodate later insertion of a rivet, and in which this rivet is therefore the only protection against the short pins being pulled out of the coupler from the constant load or otherwise, the bracket pins of the present invention need not be bored through since the present invention may not need or utilize a rivet. That may make the bracket pins stronger than the bored-out short pins. Furthermore, instead of a rivet, an additional small pin may be used to secure the bracket pins. Not relying on a rivet may provide two additional advantages for the present invention over the prior art. In contrast to a prior art rivet driving and securing system, (see FIG. 2 as an example) which requires a semi-manual action, making it difficult to assure quality, and which tends to lose its initial tension over time since rivets are made of soft steel, the assembly of the present invention without the rivet (for example, using a security pin instead) may be fit for full automation, enabling better quality and the ability to meet the 20 year lifetime requirements. In further contrast to prior art universal joints (for example FIG. 2), in which the short pins may have only a relatively short section, for example as little as half the diameter of the short pin extending into the coupler, the bracket pins of the present invention may include a bracket pin extension that may penetrate deeper into the coupler. Accordingly, whereas the short pins of the prior art may be prone to being pulled out of the coupler, due to not penetrating enough into the coupler and due to bending loads, the bracket pins of the present invention may not be prone to being pulled out of the coupler and may be better resistant to bending loads, and in particular to alternating bending loads that commonly affect commercial aircraft flap deploying systems. In still further contrast to the prior art universal joint, which is protected against environmental hazards by a rubber boot that over time tends be torn and pulled out of the rigid retaining rings surrounding the boot, the booted universal joint of the present invention may utilize springy retaining rings that may in into internal protrusions in the joint members. The retaining rings may be designed to pressure the boot enough to shrink but not too much to avoid damaging the boot, thereby reducing tear, leaks and having the end of the boot being pulled out of the rings. In still farther contrast to the prior art booted universal joints, in which a grease injection may be made between the boot and the joint member of the universal joint, thereby stretching the boot, with the resulting risk of tearing the rubber (without the damage even being visible), and wherein injections are required at multiple points, the present invention may utilize a grease injection through a fitting on the center of one of the joint members of the universal joint, without contacting the boot. As a result, grease may be injected directly into its final destination, and may be injected in only a single shot with proper dispersion. The risk of damage to the boot from stretching, and even boot failure, may be avoided.

The principles and operation of an apparatus and method for a secure universal joint according to the present invention may be better understood with reference to the drawings and the accompanying description.

Figure 3:
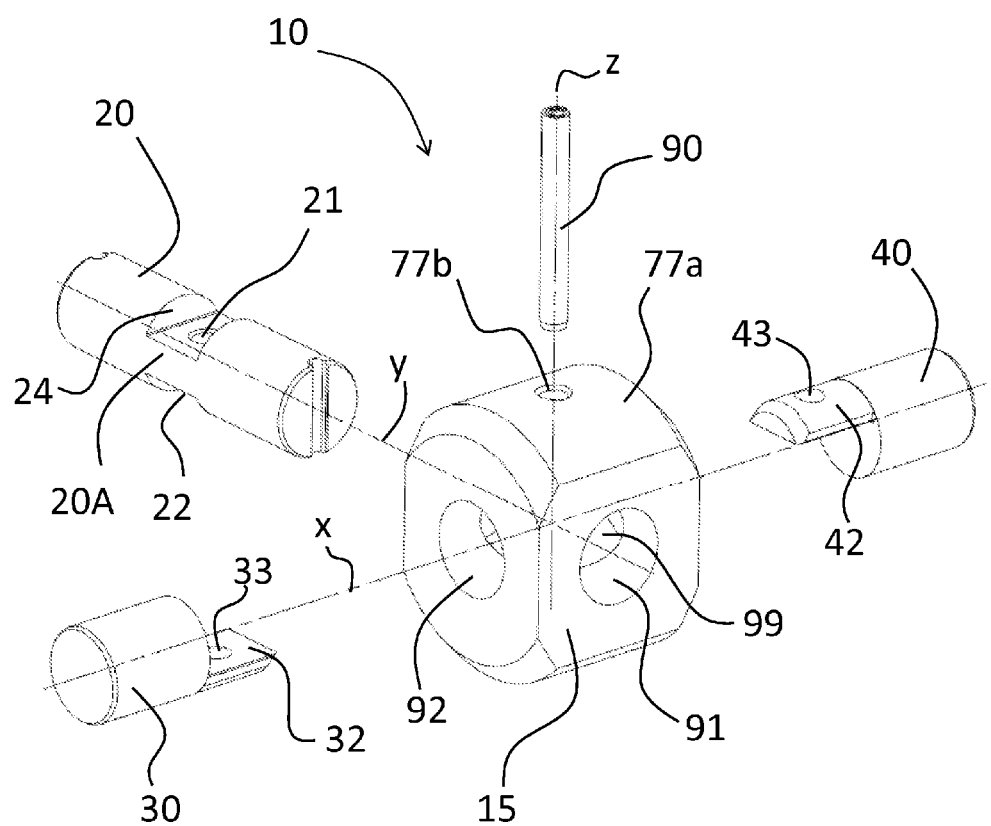
FIG. 3 is an exploded view of a universal-joint, in accordance with one embodiment of the present invention.
Figure 4:
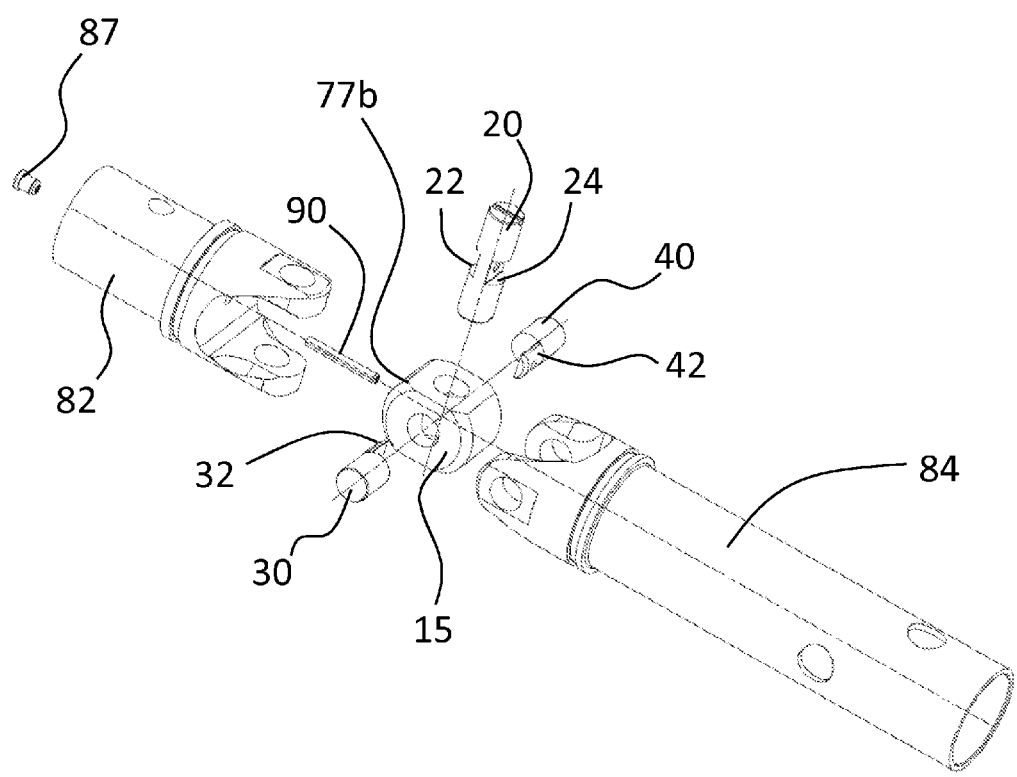
FIG. 4 is an exploded view of the universal-joint of FIG. 3 together with first and second joint members coupled together by the universal-joint.

Broadly speaking, as seen from FIGS. 3-4, the present invention may be described as an apparatus for securing a first joint member to a second joint member in a universal-joint. The apparatus may comprise at least one pin for insertion along a Y axis, at least one pin for insertion along an X axis, a coupler between the first and second joint members, the coupler configured to receive the at least one pin for insertion along a Y axis and the at least one pin for insertion along an X axis, and a security pin configured to traverse the coupler along a Z axis at a time when (i) each of the at least one pin for insertion along a Y axis and (ii) each of the at least one pin for insertion along an X axis, is within the coupler, such that the security pin penetrates at least a partial hole (for example either a hole or a partial hole) in (i) each of the at least one pin for insertion along a Y axis and in (ii) each of the at least one pin for insertion along an X axis.

Figure 9:
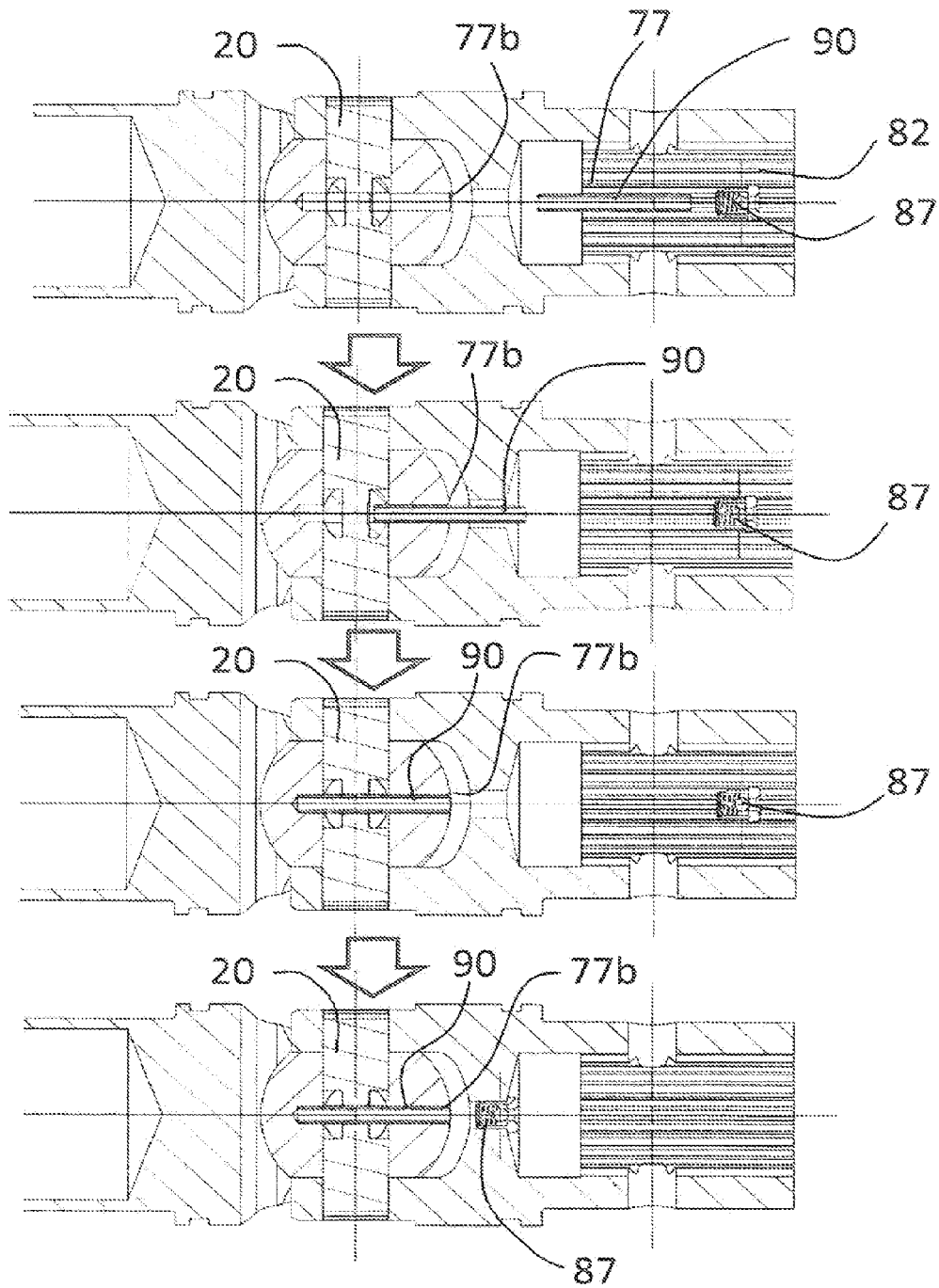
FIG. 9 is a succession of views showing insertion of a security pin into a universal-joint, in accordance with one embodiment of the present invention.

The security pin 90 may be inserted through a bore 77 in one of the joint members (as seen in FIG. 9). The entire apparatus may be such as to contain no rivets and such as to not rely on any rivets for security. The apparatus may also be configured to be assembled automatically.

Figure 6:
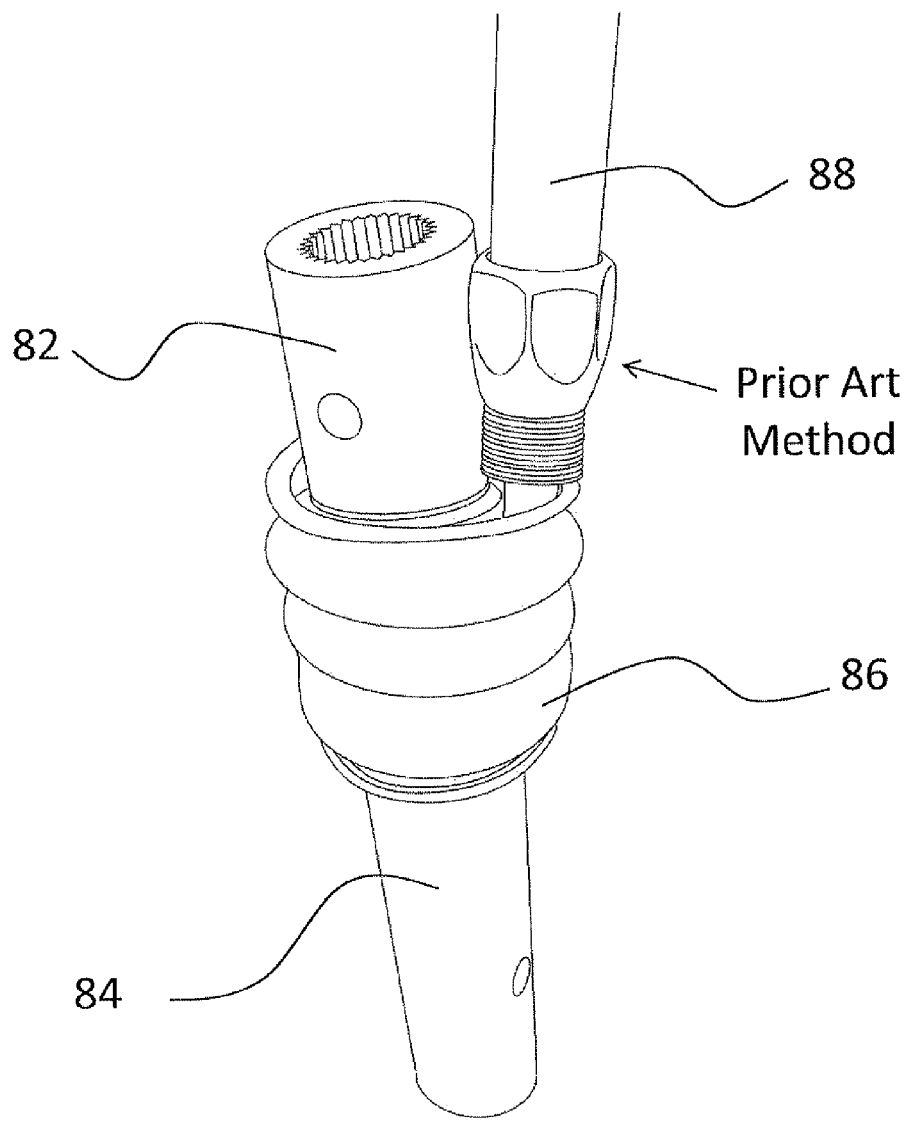
FIG. 6 shows a prior art grease injection method demonstrated on a booted universal-joint, the booted universal joint in accordance with one embodiment of the present invention.

FIG. 3 and FIG. 4 show exploded views of an apparatus 10 for securing a first joint member 82 (FIG. 4) to a second joint member 84 (FIG. 4), where for example the joint members are parts of a universal-joint. In one preferred embodiment of the broadly defined invention, the at least one pin for insertion along the Y axis is a main pin having a first recess and a second recess (or in other versions the main pin may comprise two axially aligned main pins) and the at least one pin for insertion along the X axis is a first bracket pin having a first bracket extension and a second bracket pin having a second bracket extension. In this preferred embodiment, apparatus 10 may comprise a main pin 20 that may have a first receiving area 22, which may be a first recess 22, and that may have a second receiving area 24, which may be a second recess 24. In one preferred embodiment shown in FIG. 3 and FIG. 4, main pin 20 is substantially cylindrical other than its first recess 22 and second recess 24. Other configurations of the shape of main pin 20 are possible, however, especially in regard to the shape of the cross-section of main pin 20. First and second joint members 82, 84 may be hollow. In one preferred embodiment, one of first and second joint members 82, 84 may be smooth and the other one of first and second joint members 82, 84 may be splined (see FIG. 6 which shows a prior art method applied to a boot of the present invention) to assist in transferring rotational motion, for example from a shaft.

Apparatus 10 may also include a coupler 15 that may be situated between first joint member 82 and second joint member 84. Coupler 15 may couple the first and second joint members 82, 84 using various pins, including for example the main pin 20 and bracket pins 30, 40. Coupler 15 may all transmission of rotational motion and torque through angled axes in a secure way. Apparatus 10 may also comprise a first bracket pin 30 that may have a first bracket mating member such as a first bracket extension 32 or other element that mates with a receiving area (for example first recess 22 as shown in FIGS. 3-4) of main pin 20. First bracket pin 30 may be configured to be inserted into the coupler 15 such that first bracket mating member such as first bracket extension 32 mates with the first recess 22. Likewise, apparatus 10 may also comprise a second bracket pin 40 that may have a second bracket mating member such as second bracket extension 42 or another element that mates with a receiving area such (for example the second recess 24 shown in FIGS. 3-4) of main pin 20. Second bracket pin 40 may be configured to be inserted into the coupler 15 such that second bracket extension 42 mates with the second recess 24. For example, a shape of the first bracket extension 32 may correspond to a shape of the first recess 22, and a shape of the second bracket extension 42 may correspond to a shape of the second recess 24.

At least one of first and second bracket pins 30, 40 are solid, and in a preferred embodiment, first and second bracket pins 30, 40 are both solid. For example, first and second bracket pins 30, 40 may be without a longitudinal bore, for increased strength, and may be structured to fit into coupler 15 securely through oppositely aligned openings without the need for a rivet or a separate pin to be inserted inside one or both of the bracket pins 30, 40.

Coupler 15 may have openings that may receive the first and second bracket pins 30, 40 and that may receive the main pin 20. Preferably, the openings are aligned linearly along an "axis". In a preferred embodiment, the first and second bracket pins 30, 40 penetrate coupler 15 along a first axis, for convenience called the "X axis", and main pin 20 may penetrate coupler 15 along a second axis, which may be called the "Y axis". In a preferred embodiment, a security pin 90 may penetrate coupler 15 through an opening along a third axis, called the "Z axis". The security pin 90 may be formed without a head on either end and may be structured to be automatically inserted without having to be beaten or flattened out at either of its ends. As FIG. 3 shows, in a preferred embodiment, the X, Y and Z axes are each perpendicular to one another.

FIGS. 3-4 show coupler 15 as having a substantially cubic shape. This shape is not intended as a limitation, however, and the coupler 15 may assume other shapes, for example spherical, trapezoidal, rectangular, oval, elliptical, etc. Regardless of its shape, though, coupler 15, may be configured to securely receive the bracket pins 30, 40 and the main pin 20, and preferably also a security pin 90. The preferred configuration for receipt of these components is for coupler 15 to have openings into which these components may be inserted. As can be seen from FIG. 3, FIG. 4 and FIG. 5C, for example, coupler 15 may have a central aperture 99 and in addition may have side openings on its sides or facades. Two such side openings 91, 92 are visible in FIG. 3 and FIG. 4. FIG. 3 and FIG. 4 reveal three of the five or six side openings that may be present in coupler 15 in certain preferred embodiments. The opening for example may be on a majority of its sides or almost all of its sides, for example on at least five sides of a six-sided cubic structure. These openings in coupler 15 may be found on opposite sides of each the three pairs of sides of a cubic structure. Accordingly, the central aperture 99 may also be thought of merely the common component of a single, continuous, larger cross-shaped aperture (not separately labeled) that also includes two pairs of side openings (91, 92 and third and fourth side openings not shown). The oppositely situated openings of a pair of openings may preferably be aligned linearly for insertion of the pins in a manner that traverses not just one opening but at least part of and preferably a significant part or a majority or all of, the second of the pair of oppositely situated openings. In one preferred embodiment, for example, coupler 15 has two openings that may be on opposite sides of an X axis for insertion of the two bracket pins 30, 40, and two openings that may be on opposite sides of the Y axis for insertion of the main pin 20 and at least one opening 77b on a Z axis and that may be on a fifth side 77a for insertion of security pin 90. The security pin 90 may traverse the coupler 15 or may traverse a majority of the coupler or two-thirds, 80% or 90% of the coupler in various preferred embodiments, or some other percentage such that security pin 90 is securely inside coupler 15. Bracket pins 30, 40 and main pin 20 may have central apertures for penetration by security pin 90. Accordingly, when the first and second bracket pins 30, 40 and main pin 40 have been inserted within coupler 15, for example sufficient to traverse central opening of coupler 15, security pin 90 may traverse coupler 15 sufficiently to have traversed the first, the second and the central apertures of coupler 15.

As shown in FIG. 3, first bracket pin extension 32 may have a first aperture 33 through first bracket pin extension 32 so that a security pin. 90 may be inserted through this aperture 33. Likewise, second bracket pin extension 42 may have a second aperture 43 through the second bracket pin extension 42 so that security pin 90 may be inserted through this second aperture 43. First and second apertures 33, 43 may be aligned linearly, particularly after mating respectively with first and second recesses 22, 24, as indicated by FIG. 3. The first aperture 33 may traverse the first bracket extension 32 perpendicular to a direction of insertion of the first bracket extension. Likewise, the second aperture 43 may traverse the second bracket extension 42 perpendicular to a direction of insertion of the second bracket extension 42.

Figure 10:
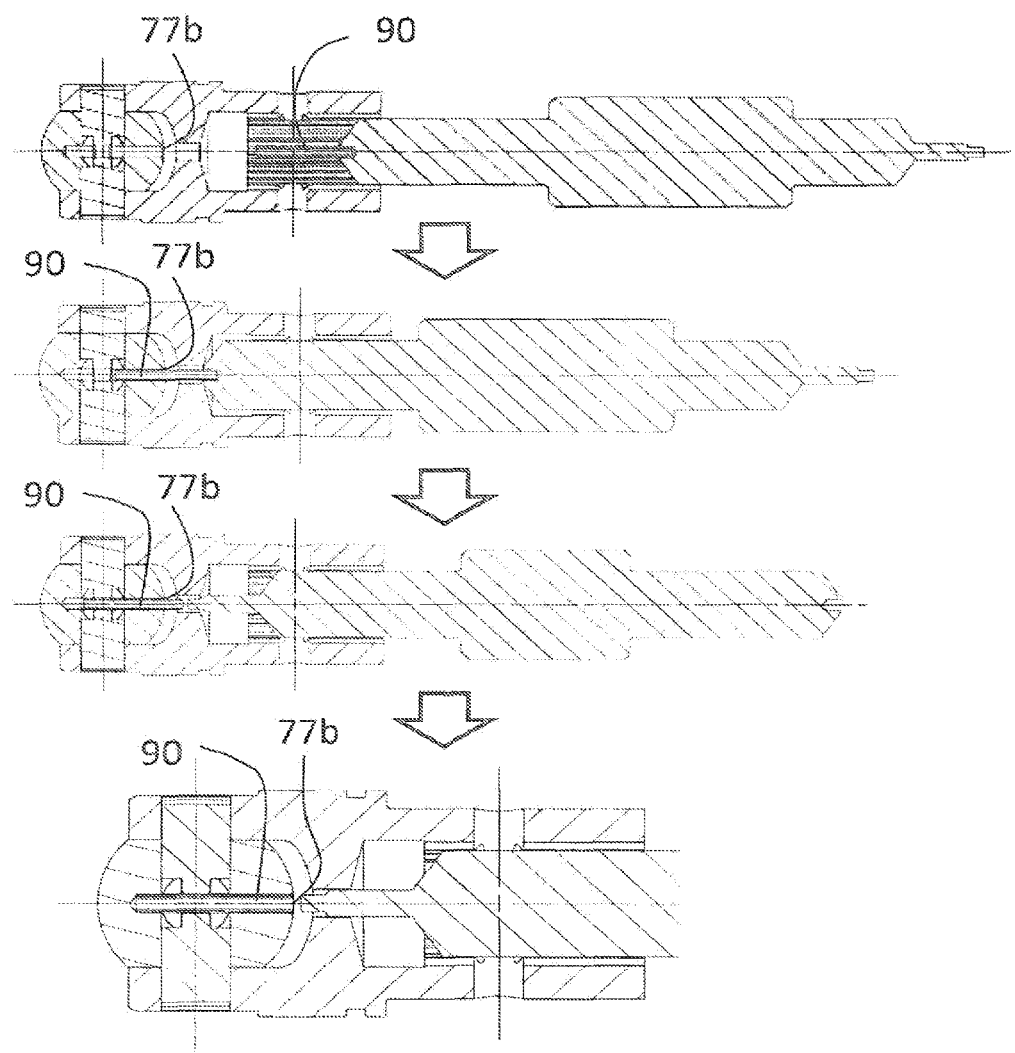
FIG. 10 is a succession of views of a security pin driving mechanism, in accordance with one embodiment of the present invention.

Main pin 20 may have a central aperture 21 adjacent the first and second recesses 22, 24 such that security pin 90 may traverse this central aperture 21. Main pin 20 may also be structured such that a central portion 20A of the main pin 20 may traverse the central aperture 99 of coupler 15. As seen from FIG. 9 and FIG. 10, security pin 90 may be inserted through a bore 77 in one of the joint members (82, 84).

Figure 5A:
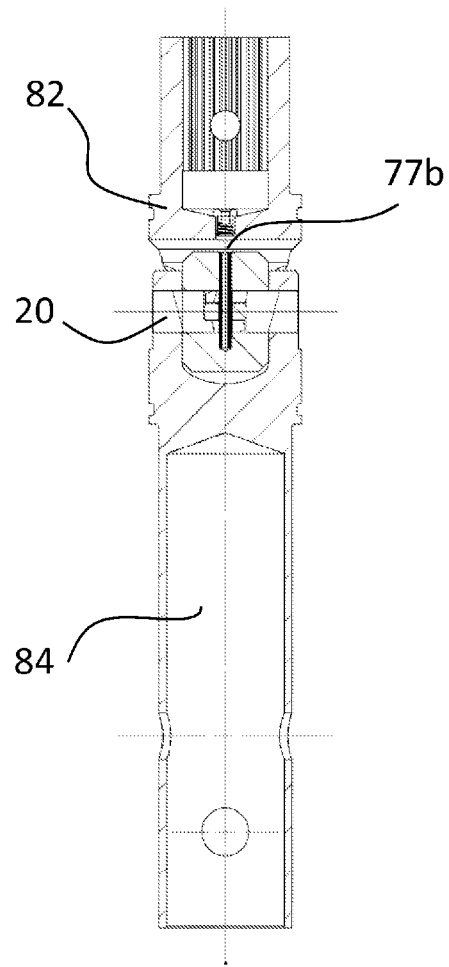
FIG. 5A shows a cross-sectional view of a universal-joint and joint members, in accordance with one embodiment of the present invention.
Figure 5B:
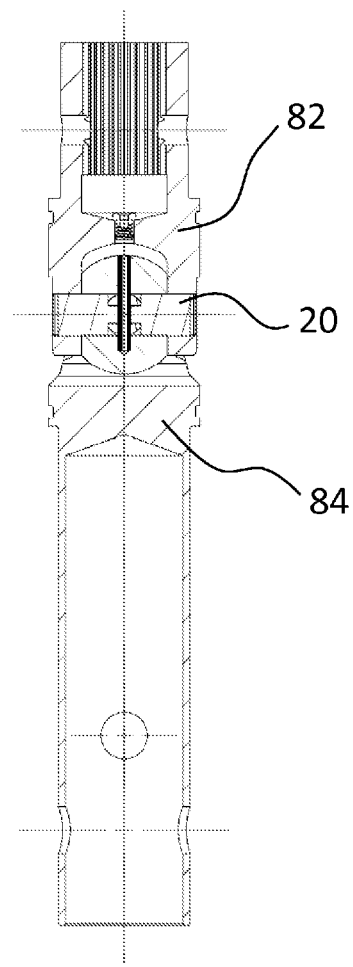
FIG. 5B is a sectional view like FIG. 5A except rotated 90 degrees, in accordance with one embodiment of the present invention.
Figure 5C:
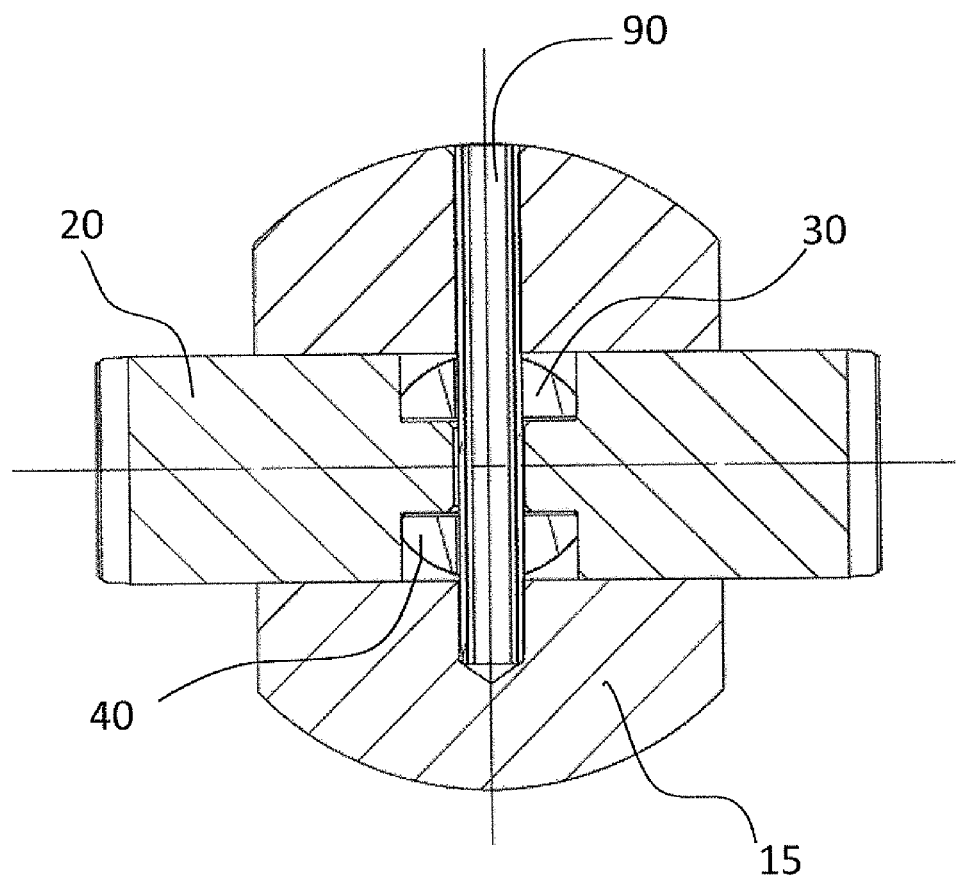
FIG. 5C is an enlarged sectional view of the portion of FIG. 5B containing the universal-joint.
Figure 5D:
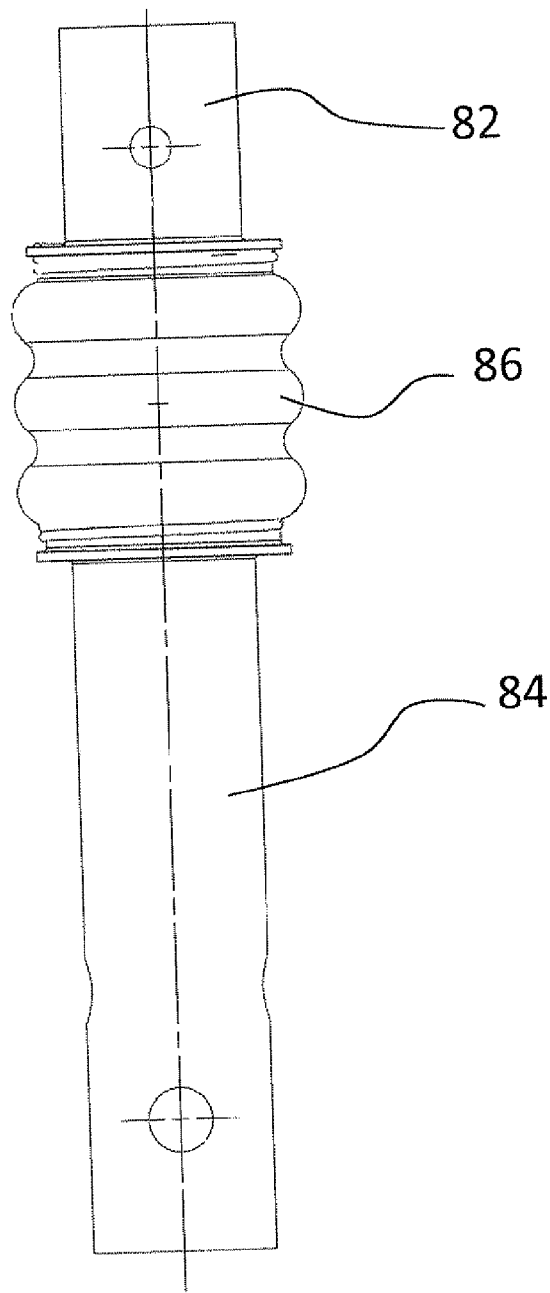
FIG. 5D is a booted universal-joint, in accordance with one embodiment of the present invention.

In one preferred embodiment seen in FIGS. 3-4 and FIG. 5C, at least one of first and second bracket extensions 22, 32 are configured to penetrate the coupler sufficient to advance across a full thickness or diameter of main pin 20. In other preferred embodiments, first and second bracket extensions 22, 32 are configured to penetrate the coupler sufficient to advance across at least a majority or two-thirds or three-quarters or 90%, of the main pin 20. In any event, first bracket extension 32 of first bracket pin 30 and second bracket pin extension 42 of second bracket pin 40 may serve keep main pin 20 centered and secure it against being pulled out.

In a preferred embodiment, seen for example in FIGS. 3-4, apparatus 10 contains no rivets and does not rely on any rivets for security. In this regard, a rivet is a pin that has a head on one end and wherein the plain end is beaten to form a second head after insertion. As a result, apparatus 10 may be configured to be assembled automatically without manual or even semi-manual intervention.

As shown in FIG. 4 and FIG. 5A-C, the present invention may also be described as the apparatus 10 combined with a first joint member 82 and a second joint member 84. As such, the present invention may comprise a first joint member 82, a second joint member 84 secured to the first joint member 82 by means of a coupler 15, and the universal joint components including the coupler 15 situated between the first and second joint members, namely main pin 20 comprising a substantially solid element having a first recess 22 and a second recess 24, a first bracket pin 30 having a first bracket extension 32, a second bracket pin 40 having a second bracket extension 42, the coupler 15 configured to receive the first and second bracket pin and the main pin 20.

The present invention may also be described as an apparatus for securing two joint members by means of an intermediary element, the apparatus comprising a main pin 20 comprising a substantially solid element having a first recess 22 and a second recess 24, a first bracket pin 30 having a first bracket extension 32, a second bracket pin 40 having a second bracket extension 42, and a coupler that receives the first and second bracket pin and the main pin, wherein at least one of the first and second bracket extensions are configured to penetrate the coupler sufficient to advance across a central aperture 21 of main pin 20. In certain preferred embodiments of this description of the apparatus, the first and second bracket extensions are configured to penetrate the coupler sufficient to advance across a central aperture 21 of the main pin on respective opposing sides of the central aperture 21.

Figure 15:
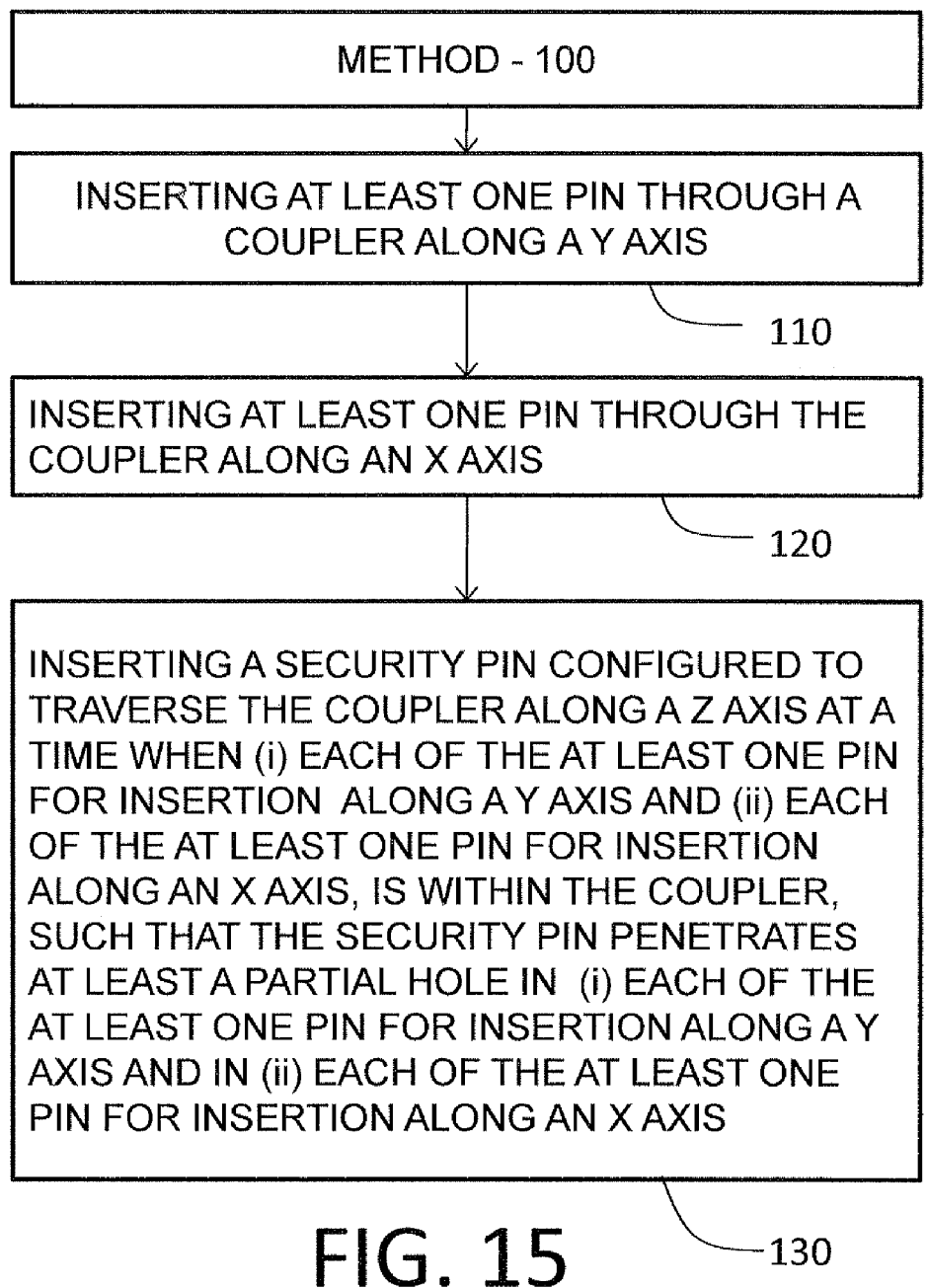
FIG. 15 is a flow chart showing a method in accordance with one embodiment of the present invention.

As shown in FIG. 15, the present invention may be described as a method 100 of securing a booted universal joint. Method 100 may have a step 110 of inserting at least one pin, for example a main pin, along a Y axis through a coupler (for example coupler 15). The main pin may have a first receiving area such as a first recess and a second receiving area such as a second recess. A second step 120 of method 100 may comprise inserting at least one pin, for example a first bracket pin and a second bracket pin, through the coupler along an X axis. The coupler may be configured to receive the at least one pin for insertion along the Y axis and the at least one pin for insertion along the X axis. The first bracket pin may have a first bracket extension and the second bracket pin may have a second bracket extension, such that at least one of the first and second bracket extensions are configured to penetrate the coupler sufficient to advance across a central aperture of the main pin. Method 100 may have a third step 130 of inserting a security pin, for example security pin 90, configured to traverse the coupler along a Z axis at a time when (i) each of the at least one pin for insertion along a Y axis and (ii) each of the at least one pin for insertion along an X axis, is within the coupler, such that the security pin penetrates at least a partial hole in (i) each of the at least one pin for insertion along a Y axis and in (ii) each of the at least one pin for insertion along an X axis. Accordingly, one version of method 100 may also have a step of using a main pin having a first recess and a second recess as the at least one pin for insertion along the Y axis and using as the at least one pin for insertion along the X axis a first bracket pin having a first bracket extension and a second bracket pin having a second bracket extension.

In one preferred embodiment of the method and apparatus of the present invention, the first and second bracket extensions penetrate coupler 15 sufficient to traverse the whole thickness of the central area 20A of main pin 20, as shown in FIG. 3 (or in other preferred embodiments, 90% or 80% or two-thirds or a majority of the thickness of central area 20A of main pin 20). In a preferred embodiment of the method and apparatus of the present invention, the first and second bracket pins are press-fitted into the coupler.

In certain preferred embodiments of method 100, there is a further step of inserting the first and second bracket pins through the coupler such that the first bracket pin extension mates with the first recess and such that the second bracket pin extension mates with the second recess. Method 100 may also have a step in certain preferred embodiments of inserting the main pin along an axis that is perpendicular to an axis of insertion of the first and second bracket pins.

In certain preferred embodiments, there may be a further step of inserting a security pin (for example security pin 90) through the coupler so as to traverse apertures in the first and second bracket pins and in the main pin. The security pin may be inserted through a Z axis, wherein the main pin may be inserted through a Y axis and the bracket pins may be inserted through an X axis, wherein the three axes are mutually perpendicular. Method 100 may also have a step of configuring three pins, namely the first and second bracket pins and the main pin, to be solid other than an aperture in each these three pins normal to a direction of insertion of each of these three pins into the coupler. Method 100 may also have a step of configuring the main pin, bracket pins and a security pin such that insertion of the main pin, bracket pins and the security is performed automatically.

In method 100 the structure of the components used in the method 100 may assume any of the structural embodiments described in relation to apparatus 10 (or other apparatuses described herein) so long as the steps of method 100 can be carried out.

Figure 7:
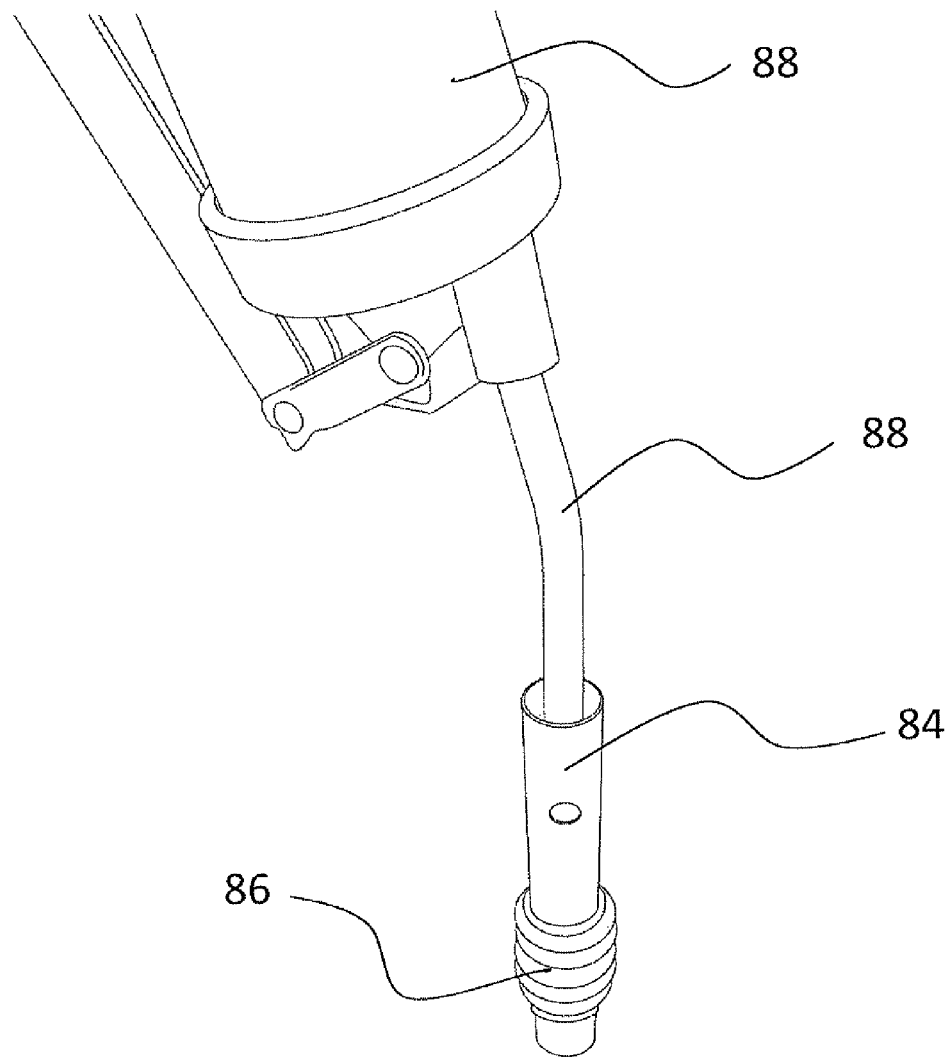
FIG. 7 shows a grease injection through a fitting mounted in a joint member, in accordance with one embodiment of the present invention.
Figure 8:
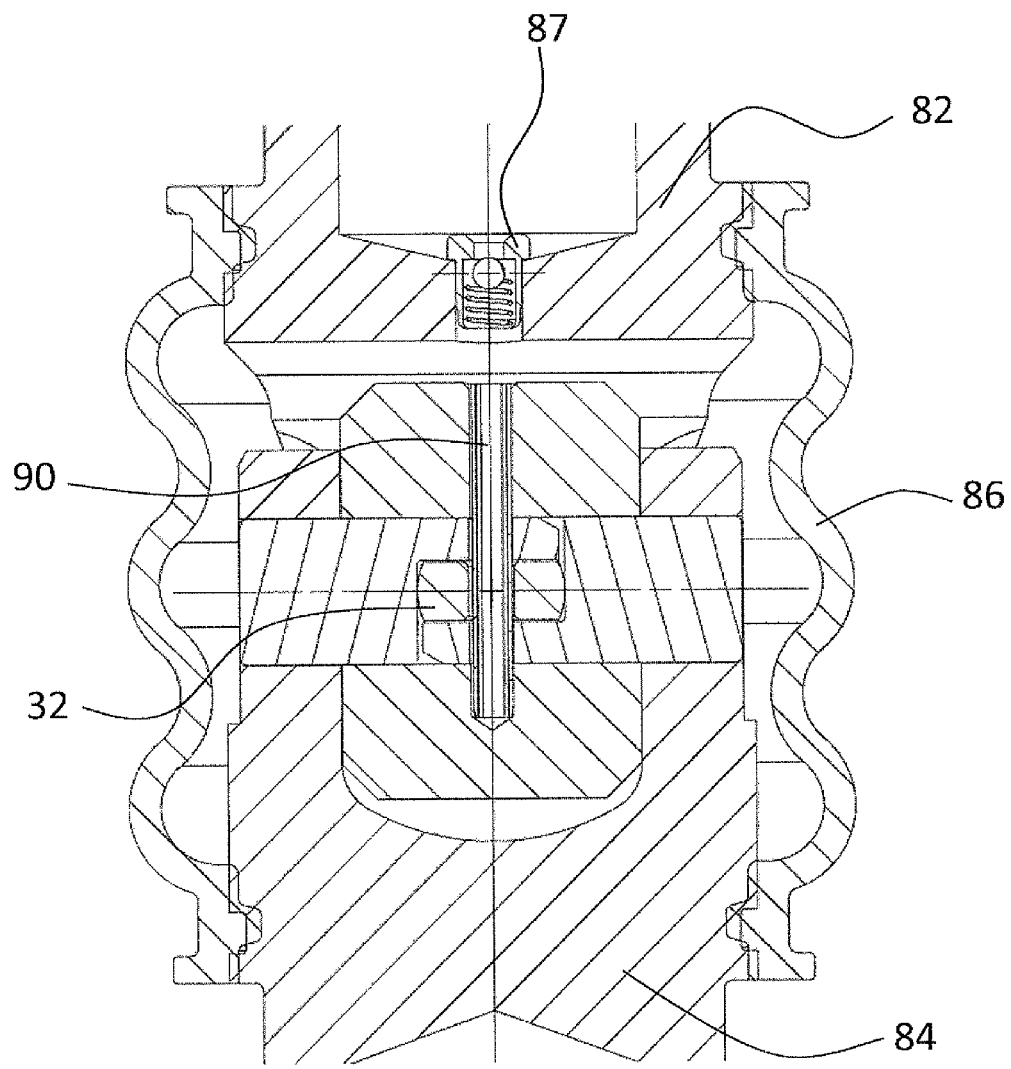
FIG. 8 is a sectional view of a universal joint and grease fitting, in accordance with one embodiment of the present invention.

As shown in FIG. 7 and FIG. 8, the present invention may be described as the apparatus 10 combined with joint members 82, 84 together with a boot 86 that fits over the universal-joint, for example a boot made of soft silicon rubber, and preferably including a grease fitting. Grease fitting 87 may fit on one of the joint members 82, 84 to guide an injection device 88 to inject grease through the fitting 87 and into a central cavity in the one of the joint members. FIG. 8 depicts a sectional view of the grease fitting 87 near the security pin 90 and other components of the universal-joint.

The present invention may also be described as a booted universal-joint, comprising a first joint member 82 and a second joint member 84, at least one of the first joint member and second joint member having a grease fitting 87 for injecting grease into a center of the joint member (82 or 84), at least one pin for insertion along a Y axis, for example a main pin 20 that may be inserted along the Y axis, at least one pin for insertion along an X axis, for example a first pin, such as for example a first bracket pin 30 and a second pin, such as for example a second bracket pin 40, that may be inserted along the X axis, and a coupler 15 between the first and second joint members 82, 84, the coupler 15 configured to receive the at least one pin for insertion along the Y axis and the at least one pin for insertion along the X axis, for example first and second pins (which may for example be first and second bracket pins 30, 40) and the main pin 20. A security pin 90 may be inserted through a hole in the grease fitting 87 to penetrate the coupler 15 preferably along a Z axis at a time when (i) each of the at least one pin for insertion along a Y axis and (ii) each of the at least one pin for insertion along an X axis, is within the coupler, such that the security pin penetrates at least a partial hole in (i) each of the at least one pin for insertion along a Y axis and in (ii) each of the at least one pin for insertion along an X axis.

Figure 13:
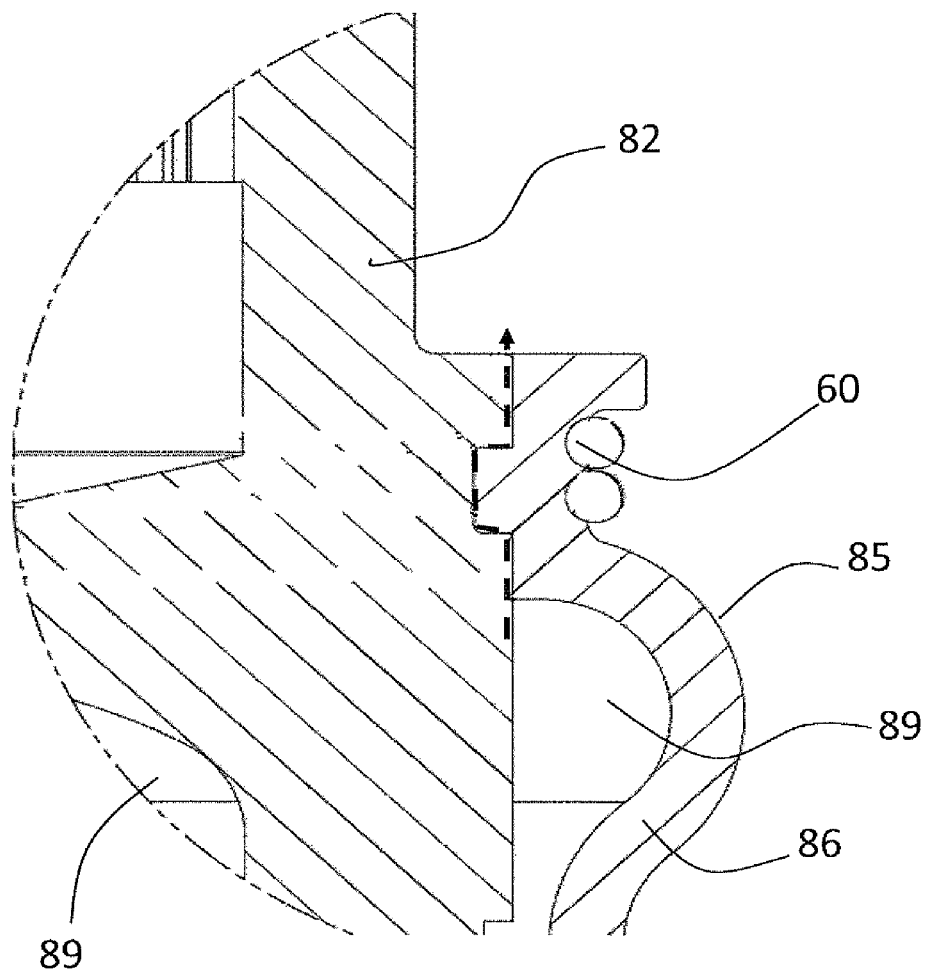
FIG. 13 is a sectional view of a part of a joint member, retaining rings and boot showing a grease leak path, in accordance with one embodiment of the present invention.

The present invention may also be described as a booted universal joint between a first joint member and a second joint member, at least one of the first joint member 82 and the second joint member 84 having a grease fitting 87 for injecting grease 89 (FIG. 13) into a center of the first or second joint member 82, 84. As shown in FIG. 13, grease 89 may also fill areas between the convoluted outer surface 85 of boot 86 and a joint member (for example joint member 82).

Figure 11:
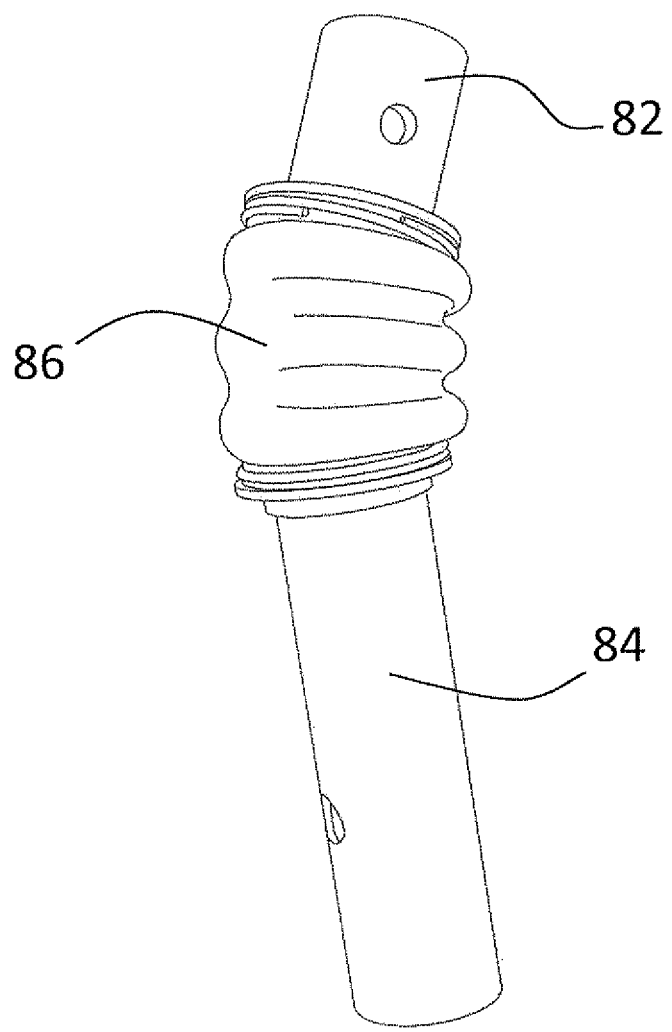
FIG. 11 is an isometric view of an articulated boot with retaining rings in accordance with one embodiment of the present invention.
Figure 12:
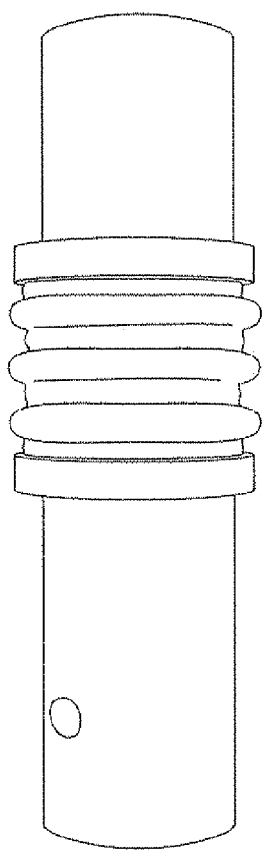
FIG. 12 is a prior art boot with retaining rings in a straight configuration.
Figure 14:
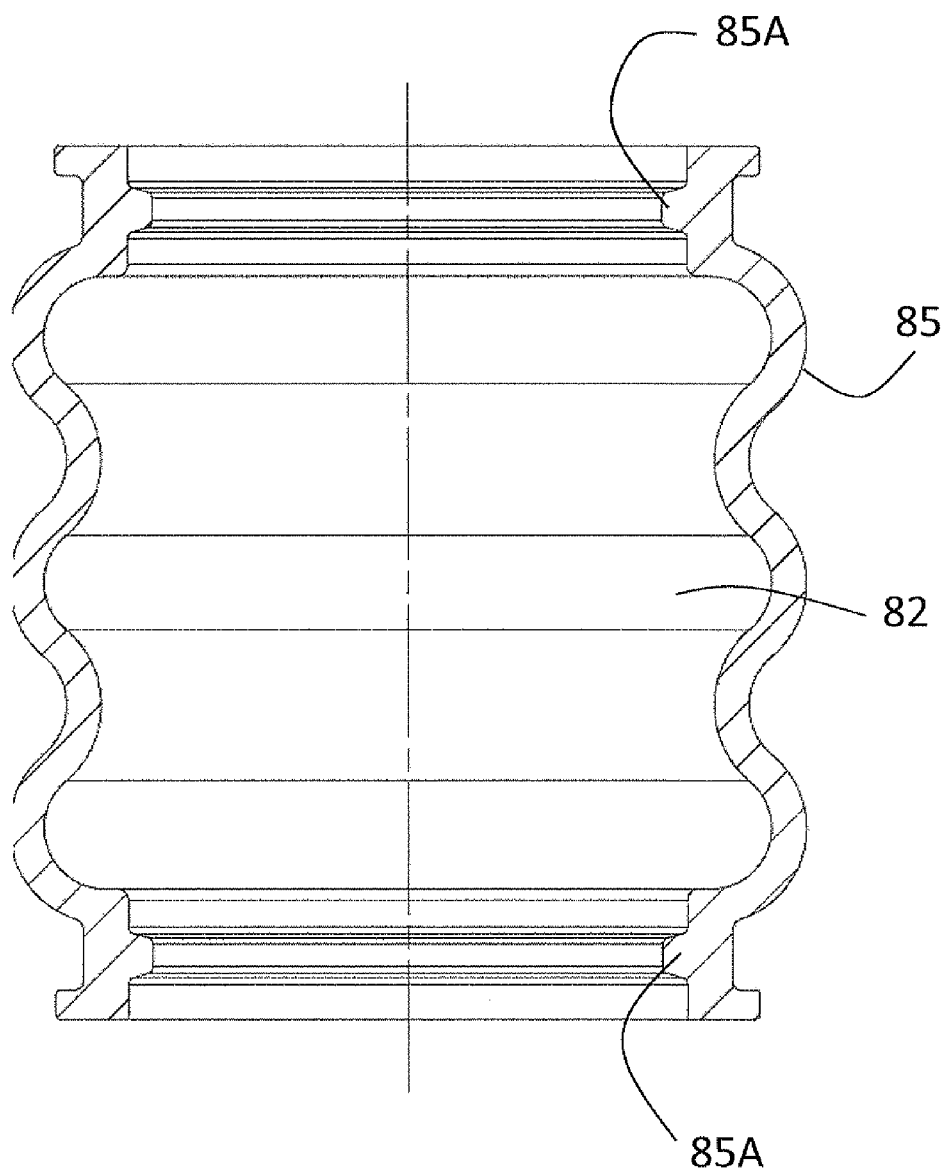
FIG. 14 is a sectional view of a convoluted joint member and retaining rings, in accordance with one embodiment of the present invention.

FIGS. 11-12 depict a prior art retaining rings and a prior art boot. As seen in FIG. 14, the boot 86 of the present invention may have a convoluted outer surface 85 including wider sections and narrower sections that may mate with a similarly shaped outer surface of the joint members 82, 84 along the length of the joint members 82, 84 that are surrounded by the boot 86. The first and last narrower sections 85A may function as seats for retaining rings 60 that help secure the retaining rings 60 to the ends of the boot 86. The retaining rings 60 may be applied to the boot 86 when retaining rings 60 are in an expanded configuration.

Retaining rings 60 of the present invention may be annular and may be configured to follow the boot 86, i.e. may be configured to cause the boot 86 to shrink in diameter under pressure. Retaining rings 60 may be made of a suitable material such as steel that has the necessary springiness (i.e. resilience). Retaining rings may have ends that overlap by a defined amount in order to fix their strength. In a preferred embodiment, the shrinkage of boot 86 caused by retaining rings 60 is substantially uniform around the circumference of the boot 86. However, retaining rings 60 may be designed to follow the boot, i.e. tightly surround and shrink the boot 86, only until a reasonable limit, so as to avoid damaging it. Retaining rings 60 may be configured such that at some point after a pre-defined amount of shrinkage of the boot 86, the boot 86 ceases to shrink and maintains its size and shape. As a result, the boot 86 may function without being torn or leaking grease and without having its ends pulled out. The amount of the resilience of retaining rings 60 and/or the amount of elastic potential energy of retaining rings 60 may be pre-set upon manufacture of the retaining rings 60 based on various factors such as its material, thickness, diameter, length, amount of overlaps, dimensions, type of spring, etc.

FIG. 13 shows the unlikelihood of grease leaking from the booted universal-joint of the present invention in embodiments in which the grease has been injected through a fitting 87 into the center of the joint member (82 or 84). The grease would have to leak and move in various directions along a winding grease leak path represented by the dotted arrow shown in FIG. 13.

The present invention may therefore be described as a booted universal joint, comprising a first joint member and a second joint member, a coupler, which may for example be the coupler 15, between the first and second joint members 82, 84. A boot 86 may cover the coupler and at least opposite ends of the first and second joint member, the boot 86 having at least one narrower section and preferably two (or more in some preferred embodiments) narrower sections 85A on opposite ends of a convoluted surface, one on each end of the boot 86. Each of the narrower sections 85A may be adjacent wider sections. Accordingly, there is at least one wider section. The booted universal-joint may also comprise at least one pin for insertion along a Y axis, for example a main pin for insertion along the Y axis, at least one pin for insertion along an X axis, for example a first and a second pin for insertion along the X axis, the coupler configured to receive the at least one pin for insertion along the Y axis and the at least one pin for insertion along the X axis, for example the first and second pins and the main pin. A springy (i.e. resilient) retaining ring 60 may be fitted, for example tightly without intervening space, on each of the at least two narrower sections of the convoluted surface of the boot. The retaining rings 60 may be configured so as, when in place, to shrink the boot to a pre-defined limit without damaging the boot and to not shrink the boot further beyond the pre-defined limit. The first and second pins may be first and second bracket pins 30, 40. The main pin may be main pin 20 that may have first and second recesses 22, 24. At least one of the first joint member 82 and second joint member 84 may include a grease fitting for injecting grease into a center of the joint member. A security pin may be insertable through a hole in the grease fitting and may be configured to be inserted into the coupler at a time when (i) each of the at least one pin for insertion along a Y axis and (ii) each of the at least one pin for insertion along an X axis, is within the coupler, such that the security pin penetrates at least a partial hole in (i) each of the at least one pin for insertion along a Y axis and in (ii) each of the at least one pin for insertion along an X axis, particularly if the coupler is coupler 15, as described in relation to apparatus 10.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. An apparatus for securing a first joint member to a second joint member in a universal-joint, the apparatus comprising:

at least one pin for insertion along a Y axis;
at least one pin for insertion along an X axis;
a coupler between the first and second joint members, the coupler configured to receive the at least one pin for insertion along a Y axis and the at least one pin for insertion along an X axis; and
a security pin configured to traverse the coupler along a Z axis at a time when (i) each of the at least one pin for insertion along a Y axis and (ii) each of the at least one pin for insertion along an X axis, is within the coupler, such that the security pin penetrates at least a partial hole in (i) each of the at least one pin for insertion along a Y axis and in (ii) each of the at least one pin for insertion along an X axis,
wherein the at least one pin for insertion along the Y axis is a main pin having a first recess and a second recess and wherein the at least one pin for insertion along the X axis is a first bracket pin having a first bracket extension and a second bracket pin having a second bracket extension.

2. The apparatus of claim 1, wherein the coupler has openings on five sides.

3. The apparatus of claim 1, wherein the security pin is inserted through a bore in one of the joint members.

4. The apparatus of claim 1, wherein the apparatus contains no rivets and does not rely on any rivets for security.

5. The apparatus of claim 1, wherein the apparatus is configured to be assembled automatically.

6. The apparatus of claim 1, wherein the first bracket extension mates with the first recess and wherein the second bracket extension mates with the second recess.

7. The apparatus of claim 1, wherein a shape of the first bracket extension is identical to a shape of the first recess and wherein a shape of the second bracket extension is identical to a shape of the second recess.

8. The apparatus of claim 1, wherein the main pin is substantially cylindrical other than the first and second recesses.

9. The apparatus of claim 1, wherein the first bracket pin extension has a first aperture through the first bracket pin extension, wherein the second bracket pin extension has a second aperture through the second bracket pin extension and where the main pin has a central aperture adjacent the first and second recesses and traversing a central portion of the main pin.

10. The apparatus of claim 1, wherein at least one of the first and second bracket extensions is configured to penetrate the coupler sufficient to advance across at least a majority of a full diameter of the main pin.

11. The apparatus of claim 1, wherein a first aperture traverses the first bracket extension perpendicular to a direction of insertion of the first bracket extension.

12. The apparatus of claim 1, wherein a second aperture traverses the second bracket extension perpendicular to a direction of insertion, of the second bracket extension.

13. A method of securing a booted universal joint, the method comprising:
inserting at least one pin through a coupler along a Y axis;
inserting at least one pin through the coupler along an X axis;
inserting a security pin configured to traverse the coupler along a Z axis at a time when (i) each of the at least one pin for insertion along a Y axis and (ii) each of the at least one pin for insertion along an X axis, is within the coupler, such that the security pin penetrates at least a partial hole in (i) each of the at least one pin for insertion along a Y axis and in (ii) each of the at least one pin for insertion along an X axis; and
using a main pin having a first recess and a second recess as the at least one pin for insertion along, the Y axis and using as the at least one pin for insertion along the X axis a first bracket pin having a first bracket extension and a second bracket pin having a second bracket extension.

14. A method of securing a booted universal joint, the method comprising:
inserting at least one pin through a coupler along a Y axis;
inserting at least one pin through the coupler along an X axis;
inserting a security pin configured to traverse the coupler along a Z axis at a time when (i) each of the at least one pin for insertion along a Y axis and (ii) each of the at least one pin for insertion along an X axis, is within the coupler, such that the security pin penetrates at least a partial hole in (i) each of the at least one pin for insertion along a Y axis and in (ii) each of the at least one pin for insertion along an X axis; and
inserting a first and a second bracket pin through the coupler such that a first bracket pin extension mates with the first recess and such that a second bracket pin extension mates with the second recess.

15. A method of securing a booted universal joint, the method comprising:
inserting at least one pin through a coupler along a Y axis;
inserting at least one pin through the coupler along an X axis;
inserting a security pin configured to traverse the coupler along a Z axis at a time when (i) each of the at least one pin for insertion along a Y axis and (ii) each of the at least one pin for insertion along an X axis, is within the coupler, such that the security pin penetrates at least a partial hole in (i) each of the at least one pin for insertion along a Y axis and in (ii) each of the at least one pin for insertion along an X axis; and
configuring three pins, namely the first and second bracket pins and a main pin, to be solid other than an aperture in each of these three pins normal to a direction of insertion of each of these three pins into the coupler.

16. A method of securing a booted universal joint, the method comprising:
inserting at least one pin through a coupler along a Y axis;
inserting at least one pin through the coupler along an X axis;
inserting a security pin configured to traverse the coupler along a Z axis at a time when (i) each of the at least one pin for insertion along a Y axis and (ii) each of the at least one pin for insertion along an X axis, is within the coupler, such that the security pin penetrates at least a partial hole in (i) each of the at least one pin for insertion along a Y axis and in (ii) each of the at least one pin for insertion along an X axis; and
configuring a main pin, first and second bracket pins and the security pin such that insertion of the main pin, first and second bracket pins and the security pin is performed automatically.

* * * * *